(12) United States Patent
Feick (10) Patent No.: US 6,435,404 B1
(45) Date of Patent: Aug. 20, 2002

(54) RETURN MAILER

(76) Inventor: William Kurt Feick, 90 Lambert Rd., New Canaan, CT (US) 06840

(*) Notice: Subject to any disclaimer, the term of this patent is extended or adjusted under 35 U.S.C. 154(b) by 0 days.

(21) Appl. No.: 09/611,901

(22) Filed: Jul. 7, 2000

(51) Int. Cl.[7] .............................................. B65D 27/06
(52) U.S. Cl. .......................... 229/303; 229/71; 229/72
(58) Field of Search ........................... 229/71, 72, 301, 229/313, 309, 303

(56) References Cited

U.S. PATENT DOCUMENTS

| | | | |
|---|---|---|---|
| 3,380,648 A | | 4/1968 | De Lyra |
| 3,899,127 A | | 8/1975 | Melander |
| 4,393,989 A | * | 7/1983 | Maclin et al. ................. 229/71 |
| 4,535,930 A | * | 8/1985 | Ward ............................. 229/71 |
| 4,809,906 A | | 3/1989 | Lombardo |
| 5,025,980 A | | 6/1991 | Blackman |
| 5,052,613 A | | 10/1991 | Lin |
| 5,213,258 A | | 5/1993 | Kim |
| 5,400,957 A | | 3/1995 | Stude |
| 5,503,328 A | | 4/1996 | Roccaforte et al. |
| 5,520,990 A | | 5/1996 | Rotermund |
| 5,713,511 A | | 2/1998 | Diamond |
| 5,826,787 A | | 10/1998 | Turner |
| 5,875,964 A | | 3/1999 | Pham |
| 5,927,595 A | | 7/1999 | Mellon et al. |
| 5,950,916 A | | 9/1999 | Santagelo |

FOREIGN PATENT DOCUMENTS

| | | | | |
|---|---|---|---|---|
| CH | 432220 | * | 9/1967 | ................... 229/72 |
| FR | 78626 | * | 7/1962 | ................... 229/72 |

* cited by examiner

Primary Examiner—Jes F. Pascua
(74) Attorney, Agent, or Firm—St. Onge Steward Johnston & Reens LLC (57) ABSTRACT

A reusable mailer is provided whereby the mailer includes a front panel, back panel, and flap having a plurality of separable panels, whereby each panel is capable of closing and opening the mailer. The mailer may also include transparent sleeves for viewing an insertable card having mailing indicia thereon. The transparent sleeves may also have masking in order to desirably display selected portions of the card. The masking may further have indicia provided thereon to further facilitate mailing the mailer to and from a recipient.

18 Claims, 6 Drawing Sheets

RETURN MAILER

FIELD OF THE INVENTION

The invention relates to an apparatus and method for reusing mailing envelopes and boxes and, more particularly, provides a mailer that can be opened, resealed, and readdressed multiple times.

BACKGROUND OF THE INVENTION

Reuseable mailing envelopes are generally used when a sender desires or anticipates a recipient to respond or take action by mail. To facilitate a recipient's response, it is typically desirable for the sender to have the recipient assert minimal effort. The rationale is that the less effort a recipient needs to exert, the more probable he will respond quickly. Hence, a reuseable mailer may be preferably sent to a recipient who in turn can reuse the mailer, which may be preaddressed by the sender, to respond. In this fashion, everything the recipient needs to respond is right in front of him and he need not get an envelope of his own or write an address on it. When everything is conveniently provided to the recipient, it generally encourages a recipient to respond more readily than if the recipient had to fetch and address the envelope himself.

A further benefit of reusable mailers, such as envelopes, is to reduce the sender's expenses. Without a reusable envelope, the sender would need to enclose a second envelope within the first envelope in order to provide the recipient with the items he needs to respond. The expense of a second envelope would be undesirable to the sender.

In addition to reducing a sender's expenses, reusable mailers may expedite the mailing process because the recipient does not need to locate and address a separate mailer. Furthermore, reusable mailers may already designate a carrier and mode of transportation, such as first class or overnight. The recipient does not need to take the time to select a cost effective carrier or mode of transportation, which may be cheaper and slower than the ones designated on the reusable mailers. Moreover, return mailers may promote sales for a sender since a recipient may be more inclined to send payment or open accounts in a preaddressed reusable mailer as opposed to locating, addressing, and mailing a mailer at the recipient's expense.

U.S. Pat. No. 5,213,258 to Kim, U.S. Pat. No. 5,400,957 to Stude, U.S. Pat. No. 5,950,916 to Santangelo, and U.S. Pat. No. 5,503,328 to Roccaforte disclose a flap to seal the envelope having a plurality of separable strips, each capable of sealing the mailer. The end most strip would be used first to seal the envelope and the recipient would thereafter separate the strip to open the envelope and reseal it using the next end most strip. The '916 patent to Santangelo further discloses that each separable strip can contain sender and recipient information so that a history of the mailings can be tracked. The '258 patent to Kim discloses an area for writing a recipient's address that can be removed and discarded so that, upon reusing the envelope, the recipient can write on the envelope below. However, the envelope in the '258 patent to Kim can be reused only twice.

U.S. Pat. No. 3,899,127 to Melander discloses a reuseable envelope where the recipient's address is printed on the outside of a transparent sleeve and the sender's address is printed directly on the envelope, beneath the transparent sleeve, with the word "to" above it. A card is placed into a transparent sleeve and the card has the sender's address on it with the word "from" above it. The card further has the word "to" printed thereon in a location, when placed in the sleeve, above the recipient's address on the front of the sleeve. The recipient can then reuse the envelope by discarding the card, revealing information directly on the envelope visible through the sleeve, and now show the recipient as the sender and vice versa. Also disclosed is flipping the card over to reveal information on the other side, such as address information. Although this invention can be reused numerous times, the original recipient's address will permanently remain on the front of the transparent sleeve, thereby limiting the use of the reusable mailer. Further, the original recipient's address remains in the same location and this may be confusing to the delivery personnel because the address is not in the upper left hand corner, the typical location for a senders address.

U.S. Pat. No. 3,380,648 to Lyra discloses an envelope with windows in the areas for both the sender's and recipient's addresses whereby a card having removable labels can be inserted into the envelope. The labels would have information printed thereon and the recipient can repeatedly adjust the labels so that the desired information can be shown through the windows. The envelope has two flaps that permanently close the envelope. Although the labels can be reused many times, the envelope can be resealed only twice.

U.S. Pat. No. 4,809,906 to Lombardo discloses an envelope with a removable window that has information on the outside of it. The window can thereafter be removed, leaving a hole in the envelope, to show a paper inside having other information on it.

U.S. Pat. No. 5,826,787 to Turner discloses a pair of foldable flaps, one larger than the other, where the larger flap is used to fold over the smaller flap and seal the envelope. The recipient then tears open the larger flap to reveal the smaller flap, which is used to reseal the envelope. Also disclosed is a single flap with a perforation across the adhesive used to seal the envelope. The sender would use only the lower portion of the adhesive below the perforation. The recipient would tear the flap along the perforation to open the envelope and reseal it by using the upper portion of the adhesive. The main disadvantage is that the envelope can be reused only twice.

U.S. Pat. No. 5,927,595 to Mellon and U.S. Pat. No. 5,025,980 to Blackman disclose an envelope that has inner and outer flaps, each with an adhesive for sealing the envelope and a tear strip for opening the flap. The inner flap is folded inside the envelope while the outer flap seals it. Once the recipient uses the tear strip to open the envelope, the inner flap can then be accessed and used to reseal the envelope.

A general disadvantage of the mailers disclosed in the above references is that the reusable envelopes may be reused, in most cases, only twice and if they are able to be reused a multitude of times, the envelopes have limited uses for there is information permanently printed on the envelopes. Another disadvantage of the mailers disclosed in the above references is that they generally relate only to envelopes and not other mailers, such as boxes or containers. Still another disadvantage is that the above mailers do not permit electronic tracking so that one can determine whether or not a mailer is being sent from a sender to a recipient or a recipient to a sender or other party.

What is desired, therefore, is to provide a reusable mailer that can be repeatedly used without limiting the use of the mailer due to information permanently printed on it or on a card that is to be inserted into the mailer. What is also desired is a reusable mailer that is not limited to envelopes but includes boxes and other mailing containers that can be advantageously reused. What is further desired is a mailer that, upon reuse, has information in the proper location clearly identifying the sender and recipient. What is still further desired is an electronically trackable mailer that can be tracked whether it is being mailed to or from a recipient.

SUMMARY OF THE INVENTION

Accordingly, it is an object of the invention to provide a repeatedly reusable mailer.

Another object of the invention to provide a reusable mailer having insertable, clear sleeves for permitting mailing indicia to be seen.

It is a further object of the invention to provide a reusable mailer in the form of a box or container for mailing parcels.

It is yet another object of the invention to provide a system that electronically tracks the reusable mailer whether the mailer is going to or from a recipient.

These and other objects of the invention are achieved by providing a return mailer having a front panel, back panel, and a flap to close the mailer having a plurality of separable panels. The return mailer may also have two transparent sleeves, one on top of the other, on the outside of the front panel so that a card having mailing indicia printed thereon may be inserted between the transparent sleeves. Each transparent sleeve may further have masking thereon so that, upon insertion between the sleeves, a portion of the card's indicia is masked. Further, the sleeves may have different maskings, whereby different portions of the card may be masked depending upon which sleeve the card is inserted. In addition, multiple cards having varying indicia may be used and interchanged to facilitate mailing the mailer to and from a recipient.

The masking on each sleeve is also removable in order to provide unobstructed viewing of the indicia printed on the cards and, if varying portions of the cards are to be masked, may further be adjustable. In addition, the masking may also have indicia printed thereon in order to impart general information, such as labeling a sender and recipient.

The return mailer is not limited to being in the form of an envelope but may desirably be a box or container so that large parcels may be shipped according to the invention.

In order to facilitate insertion of the card, the transparent sleeves may permit the card to be inserted from a side or top or both. Furthermore, the transparent sleeves may have an opening in the middle, as opposed to the ends, of the sleeves in order to more securely hold the card in the sleeves.

In an alternative embodiment, a transparent sleeve may be placed on each the front and back panel to further facilitate a return mailing from a recipient, whereby the recipient need only insert a card in one sleeve in addition to or instead of removing the card inserted by the sender in the other sleeve. Hence, a recipient may not need to adjust or remove masking or determine the proper sleeve to insert the card.

In another embodiment, the card having mailing indicia printed thereon may further have billing information on it so that a payor and method of payment can be identified. Also, multiple cards may be used where one card contains mailing indicia and another contains billing information. This may be desirable where one sleeve has likewise been designated to contain mailing indicia and the other sleeve to contain billing information.

In yet another embodiment, the cards may have electronically scannable identifying information printed thereon so that, upon being scanned, one can determine who the sender or recipient is and who is paying for postage and in what manner. Other information may also be provided, such as the destination address and whether or not a return mailing has been authorized. The scannable identifying information may comprise a bar code or other known scannable information and may be scanned by known scanning devices.

The invention and its particular features and advantages will become more apparent from the following detailed description considered with reference to the accompanying drawings.

DETAILED DESCRIPTION OF THE DRAWINGS

Figure 1:
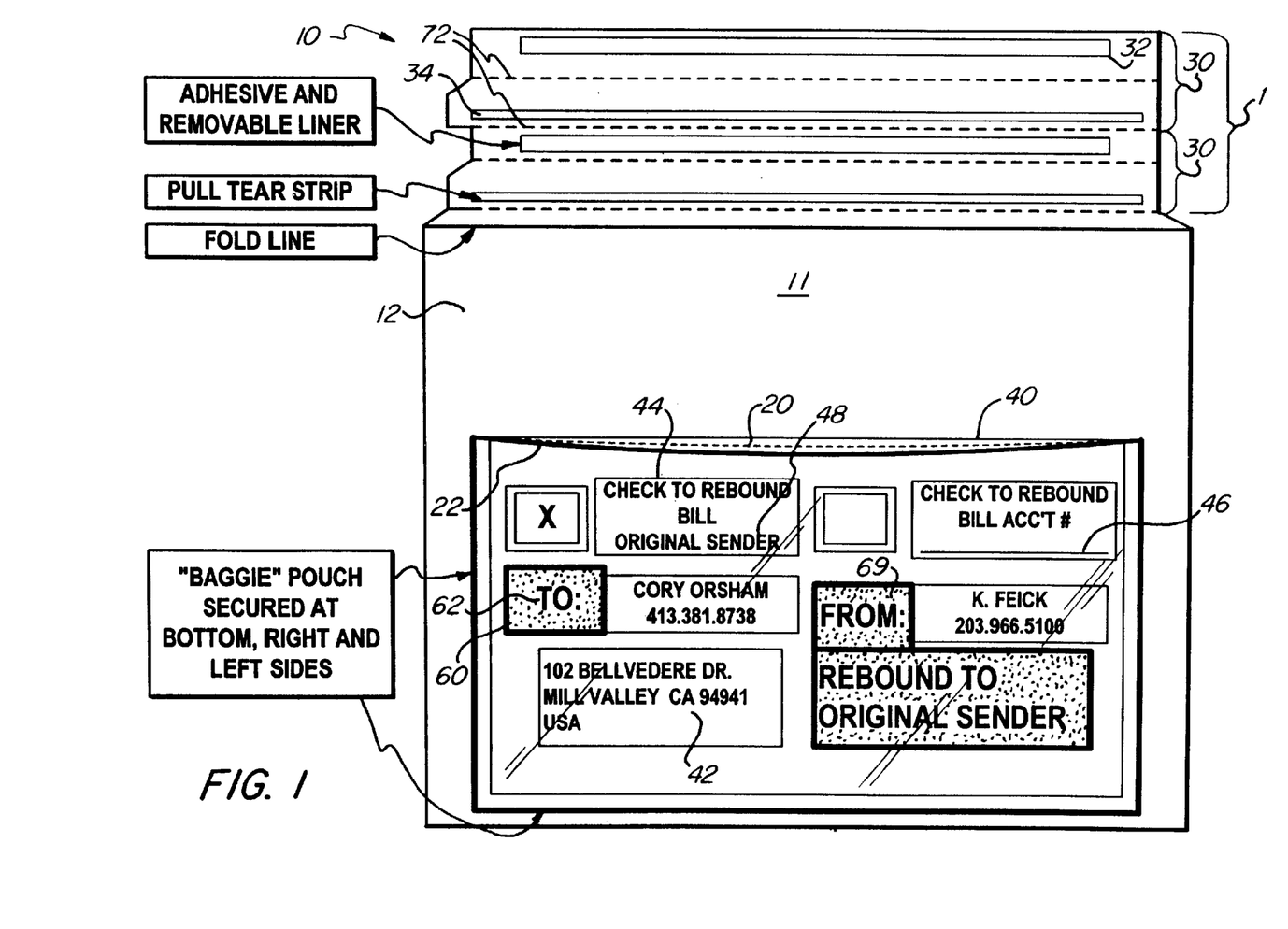
FIG. 1 is a front view of the Top Loading Return Mailer.

FIG. 1 depicts a return mailer 10 that is top loaded and capable of being reused a multitude of times. Mailer 10 comprises a front panel 12, back panel 14, flap 16, first transparent sleeve 20, second transparent sleeve 22, and a card 40 having mailing indicia thereon.

Front panel 12 and back panel 14 are sealed together on three sides. The fourth side has flap 16 extending from an edge of back panel 14 and is used to seal mailer 10. Although flap 16 extends from back panel 14, mailer 10 may be made to provide flap 16 extending from an edge of front panel 12. Flap 16 comprises a plurality of separable panels 30, whereby each panel further comprises an adhesive 32 extending across an inner surface of panel 30 for securing said flap to said front panel and a tear strip 34 extending across an inner surface of panel 30 for opening mailer 10.

Adhesive 32 is known in the art to be a variety of different materials. Adhesive 32 can be permanent or non-permanent. Adhesive 32 can further be water soluble or insoluble. Adhesive 32 can also be covered by a non-stick paper that is removable prior to sealing mailer 10. Adhesive 32 can also be uncovered whereby adhesive 32 is activated upon being moistened.

Mailer 10 is sealed by closing flap 16 onto front panel 12 and pressing together the adhesive on the end-most panel, the panel furthest from the edge of the back panel from which flap 16 extends, and front panel 12. A recipient of mailer 10 can thereafter open the mailer by pulling on tear strip 34, which will cause the end-most panel to separate from flap 16 along perforation 72. The recipient can then reuse the mailer by repeating the sealing process mentioned above whereby the originally second end-most panel is now the end-most panel.

Both first 20 and second 22 transparent sleeves are made of transparent, flexible material such as plastic or other known materials. First transparent sleeve 20 is located directly on the outer surface of front panel 12. First transparent sleeve 20 is secured to outer surface of front panel 12 on at least three sides, leaving one side open so as to allow card 40 to be insertable between first transparent sleeve 20 and front panel 12. FIG. 1 depicts a top loading mailer whereby card 40 is inserted between first transparent sleeve 20 and front panel 12 and/or between first 20 and second 22 transparent sleeves from the top 11 of mailer 10.

Second transparent sleeve 22 is located directly on the outer surface of first transparent sleeve 20. Second transparent sleeve 22 does not need to be the same size or material as first transparent sleeve 20 but, for an aesthetically pleasing appearance, it may be the same size and material as first transparent sleeve 20. Like first transparent sleeve 20, second transparent sleeve 22 is substantially transparent and flexible and also secured on at least three sides so as to permit card 40 to be inserted and secured in place.

Card 40 is to be removably insertable between front panel 12 and first transparent sleeve 20 and between first transparent sleeve 20 and second transparent sleeve 22. Card 40 may also have mailing information 42 printed thereon in order to identify the sender, recipient, and provide other information such as billing indicia 44. Card 40 may provide the above mentioned information in a variety of manners.

For example, a front surface of card 40 may identify the sender and recipient by providing lines 46 for the sender to write upon or card 40 may have both the sender's and recipient's addresses preprinted 48 thereon.

Further, rear surface of card 40 may identify the original sender as a recipient and the original recipient as a sender using the same manner as the card's 40 front surface provides. A sender will then use the front or rear surface of card 40 as applicable.

Card 40 may also contain billing indicia on both sides such the names of the sender and recipient so that one can mark the paying party. For example, there may be check boxes next to each name and the sender would simply check off which party was paying the postage. Or one can simply circle the payer. Further, both sides of card 40 would contain billing information so that a recipient would be able to not only reuse and readdress mailer 10, but to designate the payer to be the original sender. In addition, a plurality of cards 40 may be included so that mailer 10 can be readdressed multiple times.

First transparent sleeve 20 may further have masking 60 thereon in order to hide an area of card 40 when card 40 is inserted between first transparent sleeve 20 and front panel 12. In this manner, a reader, when viewing mailer 10, will see card 40 through first 20 and second transparent sleeves 22 but will only see portions of card 40 not covered by masking 60. The advantage is that card 40 may identify a sender under label "To" 62 and recipient under label "From" 64 but masking 60 will reverse the labels so that the sender is now the recipient and vice versa. If masking is not desired, a sender can simply insert card 40 between first 20 and second 22 transparent sleeves, where masking 60 is now hidden to a reader.

Masking 60 is not limited to covering "To" 62 and "From" 64 labels but may be used to mask other areas of card 40. For example, it may be advantageous to mask portions of the billing indicia when indicating a payer is not necessary, such as when the sender applies postage. Further, it may be desired to mask only the recipient or perhaps other areas of card 40.

In addition, masking 60 may be free from having indicia printed thereon. For example, where a sender applies postage, identifying a payer or showing billing information may be unnecessary. Therefore, the billing indicia may be masked, whereby masking 60 would be desirably free from having indicia printed thereon Masking is not limited to first transparent sleeve 20. Masking may be advantageously placed on second transparent sleeve 22 where it is desired to continuously mask portions of card 40. For example, confidential information, such as billing account numbers, may need to be hidden from plain view.

It should be noted that the masking 60 on both first 20 and second 22 transparent sleeves may also be removable so that a sender or recipient can manipulate masking 60 to mask other information or to be completely removed.

Figure 2:
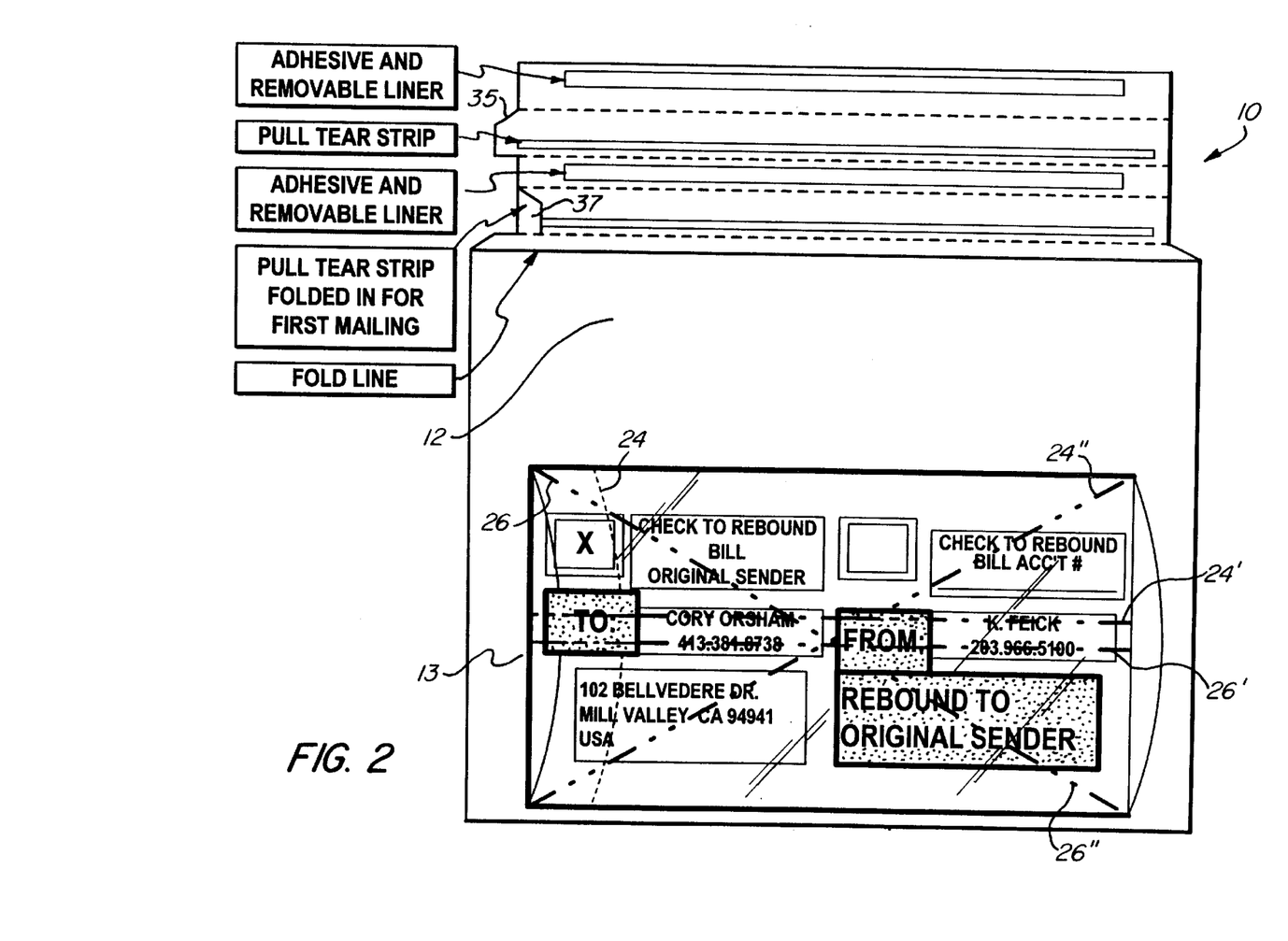
FIG. 2 is a front view of the Side Loading Return Mailer.

FIG. 2 depicts a return mailer 10 that is side loaded and capable of being reused a multitude of times. Mailer 10 comprises a front panel 12, back panel 14, flap 16, first transparent sleeve 20, second transparent sleeve 22, and a card 40 having mailing indicia thereon.

Mailer 10 is assembled in the same manner as mentioned above in FIG. 1 except that first 20 and second 22 transparent sleeves permit card 40 to be inserted from either side 13 of mailer 10.

First 20 and second 22 transparent sleeves will be made of the same materials and placed on front panel 12 in the same fashion as in FIG. 1 and will further include masking 60 on either first 20 or second 22 transparent sleeves or both.

One advantage of having card 40 insertable from a side 13 of mailer 10 is that card 40 is more securely held between first transparent sleeve 20 and front panel 12 and/or between first 20 and second 22 transparent sleeves. This is because the longer sides of card 40, as opposed to the shorter sides of card 40 as in FIG. 1, are in frictional contact with first 20 and second 22 transparent sleeves, thereby increasing the resistance to prevent card 40 from sliding out.

Further, second transparent sleeve 22 may further be secured on all four sides to first transparent sleeve 20, whereby card 40 is insertable through a slit 26 in the surface of second transparent sleeve 22. In addition, first transparent sleeve 20 may also be secured on all four sides to front panel 12, whereby card 40 would be insertable through slit 24, which is accessible through slit 26. Either or both slit 24 and slit 26 may be in a generally vertical, horizontal, or diagonal direction, as shown as phantom lines in FIG. 2 as 24, 26, 24', 26', 24" and 26", respectively.

In order to prevent accidentally opening mailer 10, tear strip 34 may be foldable, thereby hindering a user from grabbing or activating tear strip 34. As shown, tear strip 34 is folded onto itself at the end where tear strip 34 cantilevers off flap 16. This fold 37 effectively removes the cantilevered end 35, thereby rendering tear strip 34 less accessible to a user.

Figure 3:
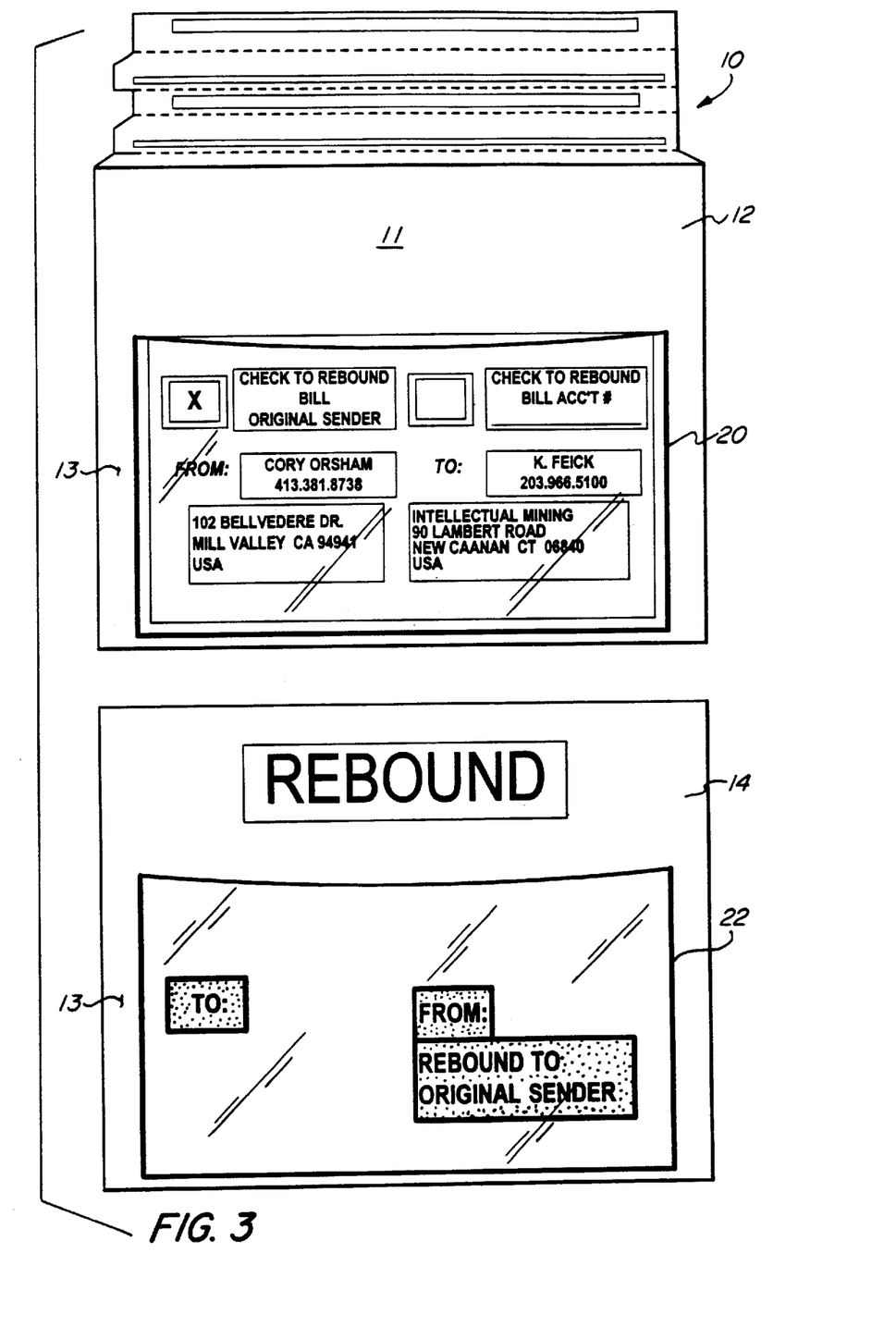
FIG. 3 is a front view of the Front and Back Loading Return Mailer.

FIG. 3 depicts a return mailer 10 that has transparent sleeves on both the front and back of mailer 10. Mailer 10 comprises a front panel 12, back panel 14, flap 16, first transparent sleeve 20, second transparent sleeve 22, and a card 40 having mailing indicia thereon.

Mailer 10 is assembled in the same manner as mentioned above in FIG. 1 except that first transparent sleeve 20 is secured to front panel 12 and second transparent sleeve 22 is secured to back panel 14. FIG. 3 shows that both transparent sleeves permit card 40 to be inserted from the top 11 of mailer 10. However, first 20 and second 22 transparent sleeves may also permit card 40 to be insertable from a side 13 of mailer 10.

First 20 and second 22 transparent sleeves will be made of the same materials as in FIG. 1 and will further include masking 60 on either first 20 or second 22 transparent sleeves or both.

First transparent sleeve 20 will be secured to front panel 12 on at least three sides, permitting card 40 to be insertable from a top 11 or side 13 of mailer 10. First transparent sleeve 20 may also permit card 40 to be insertable from a side 13 of mailer 10, achieved by securing first transparent sleeve 20 on four sides and having slit 24 as described above in FIG. 3.

Second transparent sleeve 22 will be secured to back panel 14 in the same manner as first transparent sleeve 20 is secured to front panel 12. Second transparent sleeve 22 may also be top loaded or side loaded in the same fashion.

One advantage of having a transparent sleeve on both the front and back of mailer 10 is that there may be less confusion to the sender. First transparent sleeve 20 may be designated for the original sender whereas second transparent sleeve 22 would be designated for return mailings. Further, there is less confusion as to which sleeve to insert card 40 when first 20 and second 22 transparent sleeves are adjacent to one another, as shown in FIGS. 1 and 3.

Also, since only one sleeve is used at a time for the purposes of indicating mailing information to a letter/parcel carrier, the sleeve not being used can contain other information, such as advertisements or other company information. As mentioned earlier, multiple cards 40 can be used where a second card 40 can be used to impart indicia other than mailing information.

Figure 4:
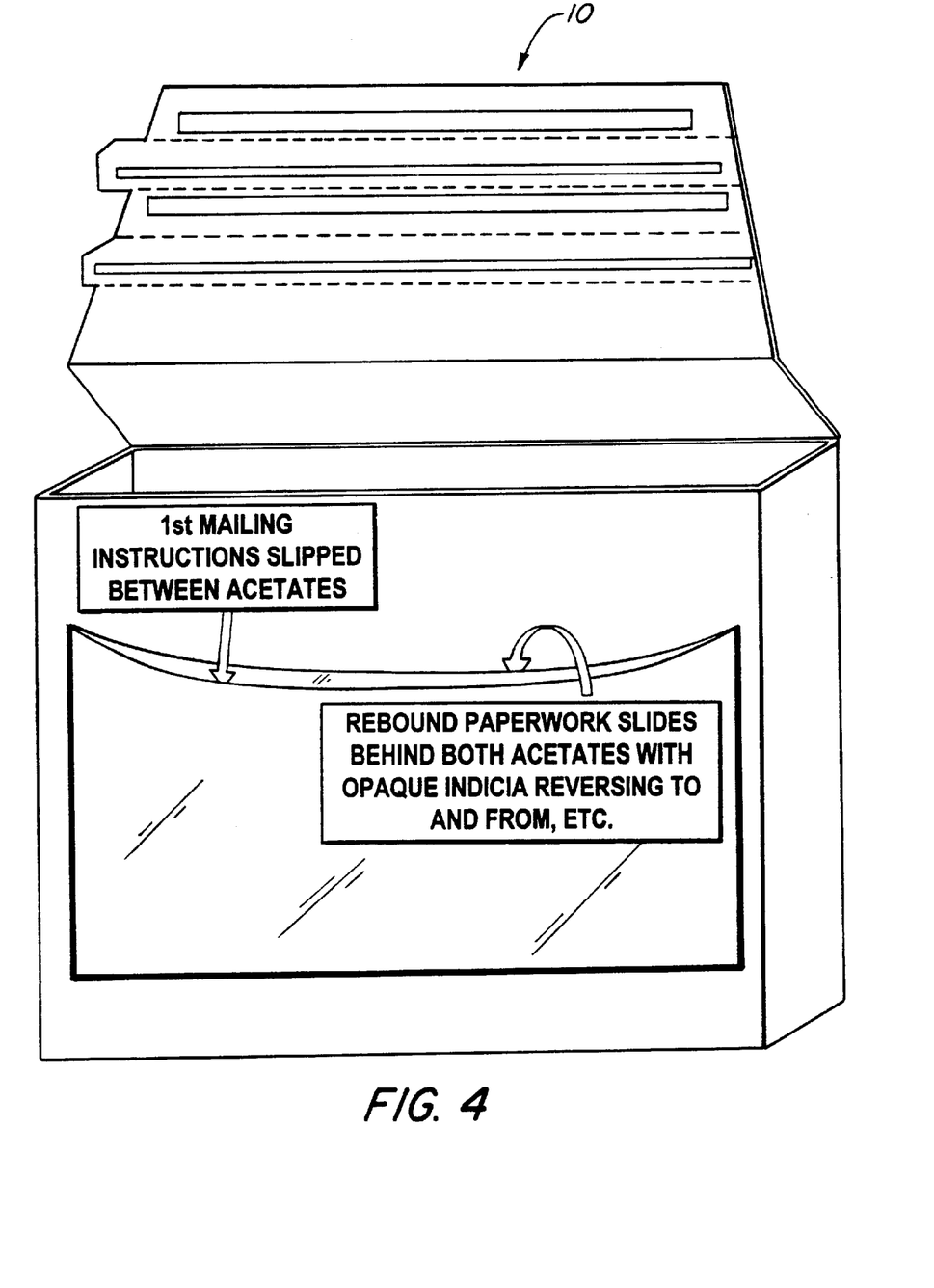
FIG. 4 is an isometric view of the Return Mailer for parcels.

FIG. 4 depicts mailer 10 to be a parcel or box. Mailer 10 should not be limited to being an envelope because the benefits of multiple reusability, transparent sleeves, masking, and cards with indicia printed thereon are useful for mailers besides envelopes. Mailer 10 depicted in FIG. 4 may include all the embodiments and variations for the first 20 and second 22 transparent sleeves and masking 60 described in FIGS. 1, 2, and 3, but would instead apply to a box, container, or parcel mailer instead of an envelope.

Figure 5:
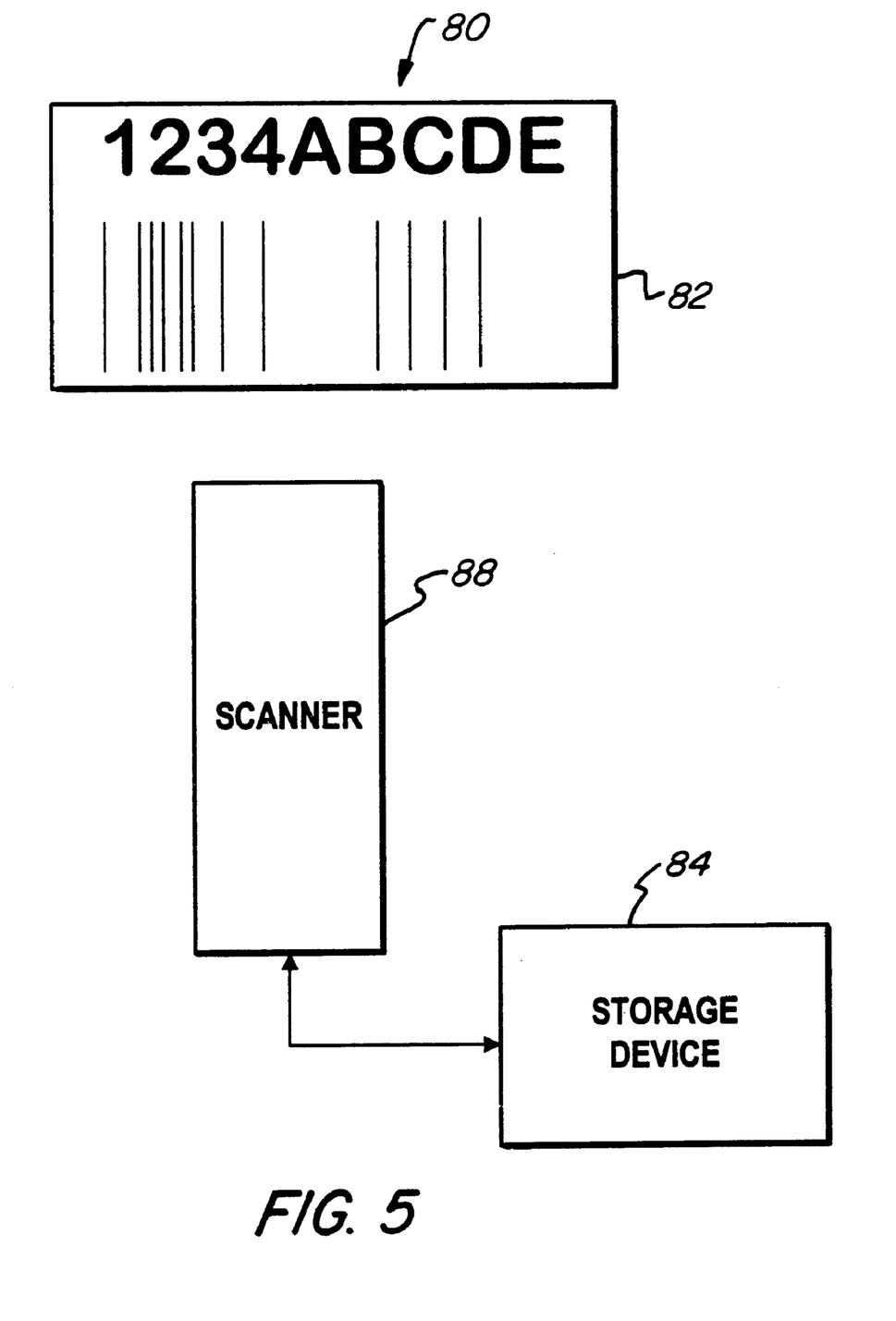
FIG. 5 is a diagram of the system for electronically tracking the Return Mailer.

FIG. 5 depicts system 80 for electronically tracking return mailer 10 comprising identifying information 82 and storage device 84. Identifying information 82 may include numeric, alphabetic, or alphanumeric code for identifying a sender, recipient, destination address, and/or billing information, such as a payor or payee. Identifying information 82 may also include other desirable information, such as a history of the mailer's destination addresses, the mailer's weight, or mailer's contents.

Identifying information 82 may be a bar code and placed on mailer 10 in the form of a sticker, which may be permanent or removable, or by a stamp. Identifying information 82 may further be placed on mailer 10 using distinctive colors or patterns unique to return mailers, thereby alerting a delivery personnel that the mailer is a return mailer and that identifying information 82 may provide the delivery personnel with additional information. In order to provide this additional information, identifying information 82 is desirably capable of being electronically scanned, or read, by typical, known scanners 88.

Identifying information 82 is unique to a particular sender, recipient, destination address, billing information, or other information. Further, identifying information 82 is preferably created on a computer, whereby a copy of identifying information 82 is stored, including the desired particular information, such as the sender, recipient, destination address, billing information, or other information, on storage device 84.

Storage device 84 is accessible by scanner 88 and upon scanning identifying information 82, the above-mentioned particular information unique to identifying information 82 may be provided. The provided information may inform the delivery personnel that mailer 10 has the original senders address as the destination address, meaning mailer 10 is on a return route. The provided information may also inform the delivery personnel as to who is paying for the delivery.

Identifying information 82 need only be created once for any changes to destination addresses or recipient can be made to the copy on storage device 84. Identifying information 82 need not be modified for, upon scanning, the new or updated information may be provided. In addition, identifying information 82 need not be modified when mailer 10 is being returned to the original sender or to a third party for this information may be provided upon scanning.

Figure 6:
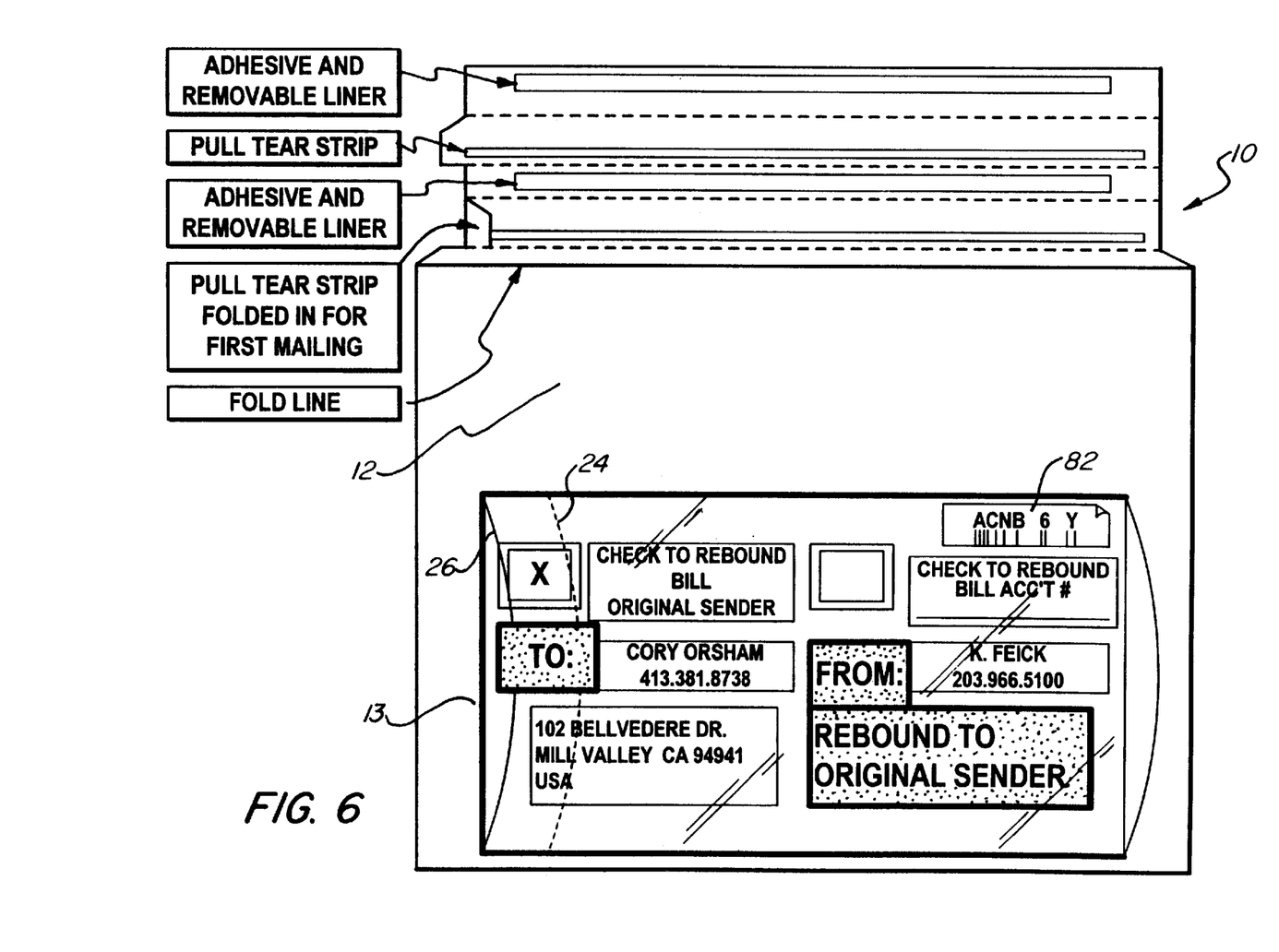
FIG. 6 is a front view of the Side Loading Return Mailer having removable identifying information.

FIG. 6 depicts return mailer 10 with identifying information 82. As shown, identifying information 82 is removable from card 40. In other embodiments identifying information 82 is permanently placed on card 40.

Furthermore, a sender may set a finite time limit for a recipient to use return mailer 10. Subsequent to the time limit's expiration, the delivery personnel, upon scanning, would be notified that mailer 10 is not to be reused and that the sender has not authorized postage payment for return mailer 10. In this effort, a sender can control postage costs.

Although the invention has been described with reference to a particular arrangement or parts, features and the like, these are not intended to exhaust all possible arrangements or features, and indeed many other modifications and variations will be ascertainable to those of skill in the art.

What is claimed is:

1. A return mailer comprising:
   a front panel having an outer surface;
   a back panel having an outer surface;
   a flap extending from an edge of said back panel and having a plurality of separable panels;
   said separable panels each having an adhesive extending across an inner surface of said separable panel for securing said flap to said front panel;
   said separable panels each having a tear strip extending across an inner surface of said separable panel for opening said mailer;
   a first substantially transparent sleeve having an inner surface and outer surface and located directly on said outer surface of front panel;
   a second substantially transparent sleeve having an inner surface and outer surface and located directly on said outer surface of said front panel, whereby said first substantially transparent sleeve is between said second substantially transparent sleeve and said outer surface of said front panel;
   at least one card having indicia printed thereon indicating a sender and a recipient for the mailer, and fitting between said first and said second substantially transparent sleeves;
   said first substantially transparent sleeve having masking provided thereon; and
   said at least one card being removable from between said first and second substantially transparent sleeves and insertable between said first substantially transparent sleeve and said front panel, said masking indicating that the sender is now the recipient of the mailer.

2. The return mailer according to claim 1 wherein said masking has indicia printed thereon.

3. The return mailer according to claim 1 wherein said return mailer is a box.

4. The return mailer according to claim 1 wherein said return mailer is an envelope.

5. The return mailer according to claim 1 wherein said return mailer is a container.

6. The return mailer according to claim 1 wherein said first and second substantially transparent sleeves allow said at least one card to be inserted from a side of said first and second substantially transparent sleeves.

7. The return mailer according to claim 1 wherein said first and second substantially transparent sleeves allow said at least one card to be inserted from a top of said first and second substantially transparent sleeves.

8. The return mailer according to claim 1 wherein said first and second substantially transparent sleeves allow said at least one card to be inserted from an opening in said outer surface of said first and second substantially transparent sleeves.

9. The return mailer according to claim 1 wherein said at least one card h as at least one portion removed.

10. The return mailer according to claim 1 wherein said at least one card has mailing information printed thereon for facilitating mailing.

11. The return mailer according to claim 1 wherein said tear strip is foldable for preventing accidental activation of said tear strip.

12. The return mailer according to claim 1 wherein said first and said second substantially transparent sleeves have slits for inserting said at least one card, said slits are in a generally vertical, horizontal, or diagonal direction.

13. A return mailer comprising:

a front panel having an outer surface;

a back panel having an outer surface;

a flap extending from an edge of said back panel and having a plurality of separable panels;

said separable panels each having an adhesive extending across an inner surface of said separable panel for securing said flap to said front panel;

said separable panels each having a tear strip extending across an inner surface of said separable panel for opening said mailer;

a first substantially transparent sleeve having an inner surface and outer surface and located on said outer surface of front panel;

a second substantially transparent sleeve having an inner surface and outer surface and located on said outer surface of said back panel; and at least one card having indicia printed thereon indicating a sender and a recipient for the mailer and fitting between said first and second substantially transparent sleeves and said outer surfaces of said front and back panels.

14. The return mailer according to claim 13 wherein at least one card is removable.

15. The return mailer according to claim 13 wherein said at least one card is insertable between said first and second substantially transparent sleeves.

16. The return mailer according to claim 13 wherein said tear strip is foldable for preventing accidental activation of said tear strip.

17. A return mailer comprising:

a front panel having an outer surface;

a back panel having an outer surface;

a flap extending from an edge of said back panel and having a plurality of separable panels;

said separable panels each having an adhesive extending across an inner surface of said separable panel for securing said flap to said front panel;

said separable panels each having a tear strip extending across an inner surface of said separable panel for opening said mailer;

a first substantially transparent sleeve having an inner surface and outer surface and located directly on said outer surface of front panel;

a second substantially transparent sleeve having an inner surface and outer surface and located directly on said outer surface of said front panel, whereby said first substantially transparent sleeve is between said second substantially transparent sleeve and said outer surface of said front panel:

at least one card having indicia printed thereon indicating a sender and a recipient for the mailer, and fitting between said first and said second substantially transparent sleeves;

said first substantially transparent sleeve having masking provided thereon;

said at least one card being removable from between said first and second substantially transparent sleeves and insertable between said first substantially transparent sleeve and said front panel, said masking indicating that the sender is now the recipient of the mailer:

at least a second card having indicia printed thereon indicating said sender to be said recipient and said recipient to be said sender; and said at least second card having indicia printed thereon indicating payment information.

18. The return mailer according to claim 17, wherein said payment information indicates a payer.

* * * * *